United States Patent Office 3,245,912
Patented Apr. 12, 1966

3,245,912
WINDSHIELD DE-ICING COMPOSITION
William G. White, Claymont, Del., assignor to E. I. du Pont de Nemours and Company, Wilmington, Del., a corporation of Delaware
No Drawing. Filed Aug. 28, 1961, Ser. No. 134,077
5 Claims. (Cl. 252—70)

This invention relates to a de-icing composition for easy removal of ice and frost which is deposited on the windshield and window areas of an automotive vehicle. More particularly the invention relates to an atomizable liquid de-icing composition which when applied to an ice-coated surface, e.g., an ice-coated glass windshield, rapidly initiates melting and softening of the ice to facilitate its removal by the windshield wiper or similar device of the rubber squeegee type.

Innumerable salts which are soluble in water and liquids which are water-miscible are recognized for their effect on depressing the freezing point of the respective aqueous solutions thereof and consequently are recognized for their usefulness as ice melters. Sodium chloride and calcium chloride are typical salts extensively used in ice removal. The lower alcohols and glycols are typical liquid freeze-point depressants useful for ice melting. While there are many effective ice-melting chemicals, the selection of species useful for frost and ice removal from the automobile windshield is particularly exclusive because of limiting qualifications aside from ice-melting capacity. The more important qualifications are:

(1) Easy application which permits substantially uniform distribution of the ice-melter over the ice-coated area,
(2) Rapid effective ice melting,
(3) Balanced volatility to provide residual de-icing activity for effective inhibition of re-icing,
(4) Non-smearing or streaking under wiper action, and
(5) Freedom from significant corrosivity or detrimental effect of the ice-melt toward areas or components exposed to contact therewith.

The ice-melting salts, e.g., sodium chloride and calcium chloride, obviously fail to meet several of these limiting qualifications. The anti-freeze monohydric alcohols likewise fail to meet one or more of the qualifications, the principal fault being high volatility which cuts down the efficiency and does not provide residual de-icer. The anti-freeze glycols have the deficiencies of poorly wetting the ice and glass, low ice melting efficency, and causing undesirable smearing. However, these glycols provide residual de-icer to inhibit re-icing. While it appears obvious that mixtures of the anti-freeze monohydric alcohols and the anti-freeze glycols would have complementary properties which compensate for deficiencies in the respective components of the mixture, such mixtures also fail to fully qualify although proprietary compositions of this type enjoy modest commercial acceptance.

The primary objective of this invention is to provide a liquid de-icer composition which adequately conforms with the aforementioned qualification. A more specific objective is to provide a liquid de-icer composition in an aerosol package, the de-icer composition therein having the aforementioned qualifications.

The primary objective is accomplished by preparing a mixture of (A) at least one water-soluble monohydric alcohol component consisting essentially of at least 50 parts by weight of isopropanol per 100 parts by weight thereof and (B) a water-soluble saturated aliphatic dihydric alcohol component comprising at least one member selected from the group consisting of ethylene glycol, 1,2-propylene glycol, dipropylene glycol, and dihydric ethers of the general formula $$HO-(CH_2-CH_2-O-)_n-CH_2-CH_2-CH_2OH$$

where $n$ is an integer in the range of 1 to 5, and including in said mixture from 0.25% to 3% by weight of (C) at least one soluble alkylphenoxypolyethanoxyethanol having from 7 to 12 carbon atoms in the alkyl substituent joined to the phenoxy group and about 8 to 20 moles of condensed ethylene oxide per mole of alkylphenol, the proportion of (B) being from 5 to 30%, and the proportion of (A) plus any water present being at least 67%, the percentages being based on the total weight of the de-icer composition, i.e., (A)+(B)+ (C)+water.

Monohydric alcohol component (A), the primary ice-melting component preferably is isopropanol. However, the isopropanol can be in combination with one or more other water-soluble $C_1$ to $C_3$ saturated aliphatic monohydric alcohols, e.g., methyl alcohol, ethyl alcohol and propyl alcohol, the isopropyl alcohol preferably constituting approximately one-half or more by weight of component (A). While methanol is a more efficient ice-melter than isopropanol, i.e., it melts more ice per gram of alcohol than isopropanol, its presence in component (A) is less desirable because of hazards involved in using methanol. Ethanol provides a slight advantage over isopropanol in reference to ice-melting efficiency, but regulatory controls on the use of ethanol, the need for denaturants, higher volatility and disproportionate cost are disadvantages in the use of ethanol. The proportion of the primary ice-melter, component (A), can range up to about 94.7% by weight of the composition, i.e., based on (A) plus (B) plus (C). Component (A) preferably is made up of commercially anhydrous grade of the defined monohydric alcohol, but absence of water from the composition is not essential to satisfactory performance. Presence of water ordinarily reduces the efficiency of the primary ice-melter, but for removal of frost rather than ice, the presence of a small proportion, i.e., up to about 5%, of water provides an advantage rather than a disadvantage. A water content of up to 15% by weight of the de-icing composition can be tolerated with acceptable moderate sacrifice in de-icing efficiency. Thus, the proportion of monohydric alcohol component (A) may be as low as about 52% of the composition when the water content is at the suggested maximum of 15%.

Component (B), the water-soluble dihydric component, supplements the primary ice-melter component (A) and the primary function thereof is to provide residual de-icer to extend the ice-melting activity and inhibit re-icing. A proportion of component (B) significantly below 5% does not provide an effective residual proportion of the dihydric component sufficient to inhibit re-icing under ordinary conditions. A proportion of component (B) in excess of 30% reduces the initial de-icing efficiency because of the corresponding reduction in the primary de-icer component (A). Such an excessive proportion of component (B) causes smearing which cannot be compensated for by the surfactant. The preferred proportion of component (B) is from about 10% to 20% of the de-icing composition, this component preferably being either ethylene glycol or a mixture of ethylene glycol and 1,2-propylene glycol containing at least 50 parts of ethylene glycol per 100 parts by weight of the (B) component. When dihydric ethers are present, they are preferably in combination with at least an equal amount of glycol, the amount of dihydric ether preferably being no greater than 10% of the entire composition.

The soluble surfactant component (C), the primary function of which is to promote wetting of the ice and the glass with the ice-melting components and to inhibit streaking by the residual dihydric alcohol component (B) under wiping action, is a condensate of an alkylphenol with ethylene oxide, i.e., an alkylphenoxypolyethanoxyethanol, having a sufficient number of condensed moles of the ethylene oxide to provide the desired hydrophilic/hydrophobic balance and solubility. The alkylphenoxy portion which constitutes the hydrophobic portion of the surfactant can have from 7 to 12 carbon atoms in the alkyl substituent, the $C_8$ octyl and the $C_9$ nonyl alkyl substituents being preferred. The alkyl substituent preferably is para to the phenolic hydroxyl. The polyethanoxyethanol portion which constitutes the hydrophilic portion of the surfactant can have a composition corresponding to about 8 to 20 moles of ethylene oxide per mole of the alkylphenol, preferably up to 15 moles of condensed ethylene oxide. Surfactants of this class are commercially available, "Triton" X–100 being representative of a preferred octylphenoxypolyethanoxyethanol and "Igepals" CO–630, CO–710 and CO–730 being representative of nonylphenoxypolyethanoxyethanols having hydrophilic portions within the preferred range.

Effective wetting and smearing inhibitive proportions of the surfactant component (C) ordinarily are in the range of from about 0.25% to about 3% by weight of the de-icing composition, preferably in the range of 0.5% to 2% with preferably 5 to 10 parts of the surfactant per 100 parts of component (B).

The de-icing composition can be applied to the surface to be treated as fine stream or spray, such as expulsion through the nozzle of a plastic squeeze bottle without any gaseous propellent. However, the de-icing composition is packaged preferably as an aerosol package to facilitate its application. While any of the ordinary aerosol propellents used in aerosol packaging can be used to pressurize the package, e.g., the chlorofluoromethanes, the chlorofluoroethanes, difluoroethane, propane, nitrogen, and carbon dioxide, use of carbon dioxide is particularly preferred.

The aerosol package of de-icing composition ordinarily is stored in the trunk or storage compartment of the vehicle and as a result of such storage, the package ordinarily is at temperature conditions which are not far removed from those which cause icing on the windshield. At subfreezing or icing temperatures, the chlorofluorohydrocarbon propellents and the hydrocarbon propellents yield a poor aerosol spray pattern and offer little advantage over the ordinary non-aerosol squeeze bottle applicator. Unlike these hydrocarbon and halohydrocarbon propellents, carbon dioxide and nitrogen which are gaseous at sub-freezing temperatures do not exhibit significant deterioration in the aerosol spray pattern as the temperature is depressed to below freezing temperature for water.

The proportion of propellent in the aerosol package can be varied widely. The upper limit is not critical and is determined by considerations of safety. With mass-produced economical thin-walled aerosol containers it is desirable from the standpoint of safety to use a proportion of propellent which develops no more pressure than about 100 pounds per square inch gauge at 70° F., a proportion which develops about 5 pounds of pressure at 70° F. being recognized as a suitable minimum. Higher proportions of propellent which develop up to 200 and even more pressure at 70° F. can be used in combination with the de-icing composition providing the package is designed to accommodate such a high pressure. Carbon dioxide is particularly useful as the propellent from the standpoint of safety and economics. A suitable proportion of carbon dioxide propellent ordinarily is in the range of about 1% to about 5% based on the weight of the de-icing composition.

The following examples are illustrative of the invention, all designated parts and proportions being expressed on a weight basis unless otherwise indicated.

|  | Examples | | |
|---|---|---|---|
|  | 1 | 1a | 1b |
| (A) Isopropyl Alcohol, Commercial Anhydrous | 85 | 94.5 | 67 |
| (B) Ethylene Glycol | 14 | 5 | 30 |
| (C) Octylphenoxypolyethanoxyethanol, "Triton" X–100 | 1 | 0.5 | 3 |
|  | 100 | 100.0 | 100 |

The respective ingredients are combined and mixed to provide a uniform de-icing mixture. The respective mixtures are loaded into aerosol containers having a capacity or about 8 fluid ounces, charging 6.72 ounces by weight of the de-icing composition and about 0.21 ounce of carbon dioxide, the relative proportions being 97 parts of de-icing composition and 3 parts of carbon dioxide propellent. The indicated 0.21 ounce of $CO_2$ propellent is sufficient to pressurize the aerosol package to about 90 pounds per square inch gauge at 70° F.

The comparative de-icer compositions are prepared as being representative of products being offered commercially:

|  | Comparative Compositions | |
|---|---|---|
|  | A | B |
| Isopropyl Alcohol | 42 | 12 |
| Methyl Alcohol | 50 |  |
| Ethylene Glycol |  |  |
| 1,2-propylene Glycol |  | 54 |
| "Freon 12" Propellent | 8 | 34 |
|  | 100 | 100 |

A third comparative aerosol de-icing composition C is found to consist essentially of about 2% $CO_2$ propellent 30% of methyl ether of diethylene glycol, i.e., methyl "Carbitol," and about 68% of an aqueous azetrope of isopropanol and methanol.

The respective compositions are comparatively evaluated as follows by a simulated field test.

(1) A 1961 Chevrolet sedan is rolled into the Chevrolet Test Center cold test room and conditioned to 0° F. for 30 minutes, the respective test samples being conditioned to the same temperature.

(2) Water is applied by spray gun onto the right half of the windshield surface to form a thin continuous layer of ice thereon.

(3) The instantaneously formed ice layer is conditioned for 5 minutes at 0° F. after spraying of the water is ceased.

(4) De-icing composition from one of the aerosol packaged test compositions is sprayed uniformly over the ice-bearing half of the windshield area for about 20 seconds.

(5) An ice-melting period of about 30 seconds is allowed prior to initiating removal of the melt and ice by means of the windshield wipers.

(6) The windshield wipers are operated for about 60 seconds, notation being made of the ice remaining in the area swept by the wiper blade and of any initial re-icing.

(7) Water is again sprayed on the area swept by the wiper blade and the degree of re-icing is noted.

After completion of the test, the windshield area is completely cleared of ice and wiped down with ethyl alcohol to remove any residue from the previous test.

After the test area is dry, the test cycle is repeated for each of the test compositions.

Results of these tests reveal significant improvement in performance of the Examples 1 and 1b compositions over each of the comparative compositions. The Example 1 composition is rated best and exhibits high ice-melting capacity and efficiency, excellent sprayability at 0° F., reduction in the tendency toward re-icing and minimum smearing or streaking under wiper action. Example 1b is rated second best, its ice-melting capacity being slightly less than that of Example 1 and its smearing resistance is inferior to that of Example 1. However, the smearing resistance is superior to that of the comparative compositions. Example 1b exhibits high resistance to re-icing. Example 1a exhibits high ice-melting capacity and freedom from smearing or streaking, but it is inferior to Examples 1 and 1b in resistance to re-icing.

Comparative compositions A and B are both inferior to Examples 1, 1a and 1b in ice-melting capacity, although they provide a high proportion of residual ice-melter to inhibit re-icing. This excessive residual ice-melter produces smearing. Comparative composition B is inferior to comparative composition A in performance and produces the poorest low temperature spray pattern. The performance of comparative composition C is rated almost equal to that of Example 1b, but it is not equally as free of smearing under wiper action.

Substitution of 1,2-propylene glycol for up to one-half the content of ethylene glycol in Examples 1, 1a and 1b provides de-icing compositions which perform in a manner substantially equivalent to that of the indicated respective examples. Full replacement of the ethylene glycol with the 1,2-propylene glycol in the Example 1 formulation yields a composition the performance of which is intermediate between that of Example 1 and 1b.

When the proportion of surfactant in the Example 1 formulation is reduced to 1 part per 100 parts by weight of the ethylene glycol, i.e., 0.14 part based on the entire composition, and the isopropanol is appropriately increased to balance the composition at 100 parts total, the resulting composition lacks the adequate resistance to smearing. At a proportion of 2 parts of the surfactant per 100 parts of the glycol, its presence began to show an effective contribution toward inhibiting smearing by the residual glycol, the preferred proportion being about 5 to 10 parts of the surfactant per 100 parts of component (B).

When the commercial anhydrous isopropanol in the Example 1 formulation is replaced respectively with mixtures of 95% of isopropanol and 5% water and 85% isopropanol and 15% water, the resulting de-icing composition exhibits a decreasing capacity for ice-melting in comparison with that of Example 1 and decreasing resistance to re-icing. However, in field tests where the windshield area is covered with frost rather than ice, the water-containing de-icing composition formulated with 95% isopropanol exhibits advantageous wetting of the frost in comparison with the substantially anhydrous composition. With water-soluble propellents such as $CO_2$ it is desirable to minimize the water content of the de-icing composition, but in non-aerosol packages up to 15% of water in the de-icing composition presents no serious problems.

Example 2

| | Parts by weight |
|---|---|
| (A) Isopropyl alcohol—commercial anhydrous | 89 |
| (B) Ethylene glycol | 10 |
| (C) Nonylphenoxypolyethanoxyethanol | 1 |
| | 100 |

The surfactant (C) is "Igepal" CO–630 which is the condensation product of 9–10 moles of ethylene oxide per mole of nonylphenol.

Example 3

| | Parts by weight |
|---|---|
| (A) Isopropyl alcohol—95% | 78.5 |
| (B) Ethylene glycol | 10.0 |
| 1,2-propylene glycol | 10.0 |
| (C) Nonylphenoxypolyethanoxyethanol | 1.5 |
| | 100.0 |

The isopropyl alcohol contains 5% of water. The surfactant (C) is "Igepal" CO–730 which is the condensation product of 15 moles of ethylene oxide per mole of nonylphenol. "Igepal" CO–710, the condensation product of 10–11 moles of ethylene oxide per mole of nonylphenol, substituted for the indicated surfactant component (C) in Examples 2 and 3 provides equivalent products.

These compositions and the Example 1 composition are respectively loaded into plastic squeeze bottles having a spray cap. Comparative composition A minus the aerosol propellent is similarly packaged as a reference composition.

Test surfaces are prepared by mounting flat sheets of glass of windshield grade on wooden frames each equipped with an ordinary motor driven windshield wiper blade. The test frames are stored in a sub-freezing chamber at about 20° F. and, after reaching the chamber temperature, are provided with a thin layer of ice by spraying water on the respective surfaces. Then the respective de-icing compositions are applied to the iced glass, uniformly distributing the composition expelled from the squeeze bottle spray cap over the test area for about 20 seconds. Thereafter the test schedule follows that outlined above for Example 1 where an actual automobile is used in the test.

The performance of Examples 2 and 3 is comparable with that of Example 1, Example 2 being rated about equal to Example 1, and Example 3 being rated second best. Comparative composition A is rated fair by comparison. Its ice-melting efficiency is significantly less than that of the Examples 1–3 and while this composition A has high residual ice-melting capacity, the residual ethylene glycol is sufficiently excessive to cause significant smearing.

The compositions of Examples 2 and 3 loaded as an aerosol package having $CO_2$ as the propellent pressurized to 90 pounds per square inch gauge at 70° F. likewise perform comparably with the aerosol-packaged Example 1 composition. The aerosol-packaged Example 3 is again rated second best to Examples 1 and 2 and superior to the aerosol-packaged comparative composition A. With a frost-coated windshield which is ice-free, the Example 3 composition exhibits advantageous performance over Examples 1 and 2 and comparative composition A.

Another series of de-icing compositions is prepared having diethylene glycol, dipropylene glycol and polyethylene glycol having a molecular weight of about 200 respectively substituted for one-half and the entire amount of ethylene glycol specified in the Example 2 formulation. Although these compositions perform satisfactorily for de-icing, presence of these and like dihydric ethers in the de-icing composition pose a serious problem. Low volatility and high solvency of these dihydric ethers promote attack of ordinary automotive organic finishes by residual dihydric ether or by the de-icing composition spilled on the finish. Consequently, use of high solvency dihydric ethers in the de-icing composition is minimized.

I claim:

1. A de-icing composition, for facilitating the removal of ice and frost from the windshield and like transparent areas of an automotive vehicle, consisting essentially of (A) a water-soluble primary ice-melting component consisting essentially of at least one $C_1$ to $C_3$ saturated aliphatic monohydric alcohol, the composition of which contains at least 50 parts of isopropanol per 100 parts thereof, (B) an auxiliary water-soluble ice-melting dihydric alcohol component, having the characteristic of inhibiting re-icing, and selected from the group consisting of ethylene glycol, 1,2-propylene glycol, dipropylene glycol and dihydric ethers of the general formula $$HO-(-CH_2-CH_2-O-)_n-CH_2CH_2-OH$$

where $n$ is an integer in the range of 1 to 5, and (C) at least one soluble alkylphenoxypolyethanoxyethanol surfactant having from 7 to 12 carbon atoms in the alkyl substituent joined to the phenoxy group and the hydrophilic polyethanoxyethanol group having a composition corresponding to 8 to 20 moles of ethylene oxide per mole of alkylphenol, said surfactant (C) being present in the proportion of from about 0.25% to about 3% by weight, said glycol (B) being present in the proportion of about 5% to about 30% by weight, the balance of the composition consisting essentially of said primary ice-melting monohydric alcohol component (A).

2. A de-icing composition of claim 1 which includes water in an amount up to 15% by weight.

3. A de-icing composition of claim 1 wherein said primary ice-melting component (A) consists essentially of isopropanol, said auxiliary ice-melting component (B) consists essentially of ethylene glycol, and said surfactant (C) consists essentially of alkylphenoxypolyethanoxyethanol having 8 to 9 carbon atoms in said alkyl substituent thereof and having condensed therein up to 15 moles of ethylene oxide per mole of alkylphenol.

4. A de-icing composition of claim 3 wherein said surfactant (C) is octylphenoxypolyethanoxyethanol in the proportion of 0.5% to 2%.

5. The composition of claim 3 having the following approximate composition:

| | Percent by weight |
|---|---|
| $C_2$–$C_3$ dihydric alcohol consisting of 50 to 100 parts of ethylene glycol and 0 to 50 parts of 1,2-propylene glycol | 10 to 20 |
| Alkylphenoxypolyethanoxyethanol | 0.5 to 2 |
| Water | 0 to 5 |
| Monohydric alcohol consisting essentially of isopropanol | 73 to 89.5 |

References Cited by the Examiner

UNITED STATES PATENTS

| 2,524,590 | 10/1950 | Boe | 252—305 |
| 2,731,353 | 1/1956 | Fain et al. | 252—70 XR |
| 3,096,290 | 7/1963 | Duane et al. | 252—70 |

FOREIGN PATENTS

| 119,642 | 3/1945 | Australia. |

OTHER REFERENCES

Pickthall, Glycerin in Aerosols, Manufacturing Chemist, December, 1957, pp. 541–544.

JULIUS GREENWALD, *Primary Examiner.*

ALBERT T. MEYERS, *Examiner.*